United States Patent [19]

Harney et al.

[11] Patent Number: 5,275,455
[45] Date of Patent: Jan. 4, 1994

[54] INTEGRAL MOLDING SNAP-IN ATTACHMENT FASTENER

[75] Inventors: Patrick M. Harney, Sterling Heights; Richard F. Biermacher, West Bloomfield, both of Mich.

[73] Assignee: Chrysler Corporation, Highland Park, Mich.

[21] Appl. No.: 957,131

[22] Filed: Oct. 7, 1992

[51] Int. Cl.$^5$ .................. B60R 13/02; B60J 10/04
[52] U.S. Cl. .................. 296/1.1; 296/206; 296/146.5; 49/492.1; 52/716.7; 428/31; 24/297
[58] Field of Search .......... 296/1.1, 146J, 206; 49/492.1; 52/716.5, 716.6, 716.7, 718.03, 718.06; 428/31; 24/292, 297

[56] References Cited

U.S. PATENT DOCUMENTS

| | | | |
|---|---|---|---|
| 3,171,165 | 3/1965 | Pryor | 49/492.1 |
| 3,451,709 | 6/1969 | Swauger | 293/1 |
| 3,633,316 | 1/1972 | Belser | 49/384 |
| 4,592,937 | 6/1986 | Nagato et al. | 428/31 |

FOREIGN PATENT DOCUMENTS

| | | | |
|---|---|---|---|
| 482999 | 4/1992 | European Pat. Off. | 296/146 J |
| 19639 | 6/1984 | Japan | 428/31 |

*Primary Examiner*—Dennis H. Pedder
*Attorney, Agent, or Firm*—Edward P. Barthel

[57] ABSTRACT

The present invention relates to an arrangement for attaching a decorative molding strip to an open keyhole-shaped slotted passage terminating in a lock hole provided in a vehicle body flange upper edge. A T-like fastener, integrally molded of elastomeric material, has a block-shaped head joined to the backside of a molding member by a V-shaped stem. The head inboard surface and the molding backside form layered grooves therebetween on either side of the stem. The head has a base from which project pair of upstanding forked portions separated by a V-shaped compression notch. The notch terminates in a radiused root having upwardly diverging walls disposed at a predetermined acute angle. The stem has upwardly diverging arms from a juncture the interior walls of which define a root profile matching the notch root profile. Upon the flange upper edge being received in the layered grooves an installer applies a downward force on the molding strip whereby the stem is passed through the keyhole slotted passage resiliently compressing the stem arms by virtue of inward flexing action of the head forked portions. The stem is sized for resiliently biased reception in the lock hole providing a pressure frictional snap-in fit positively securing the molding to the body panel.

10 Claims, 2 Drawing Sheets

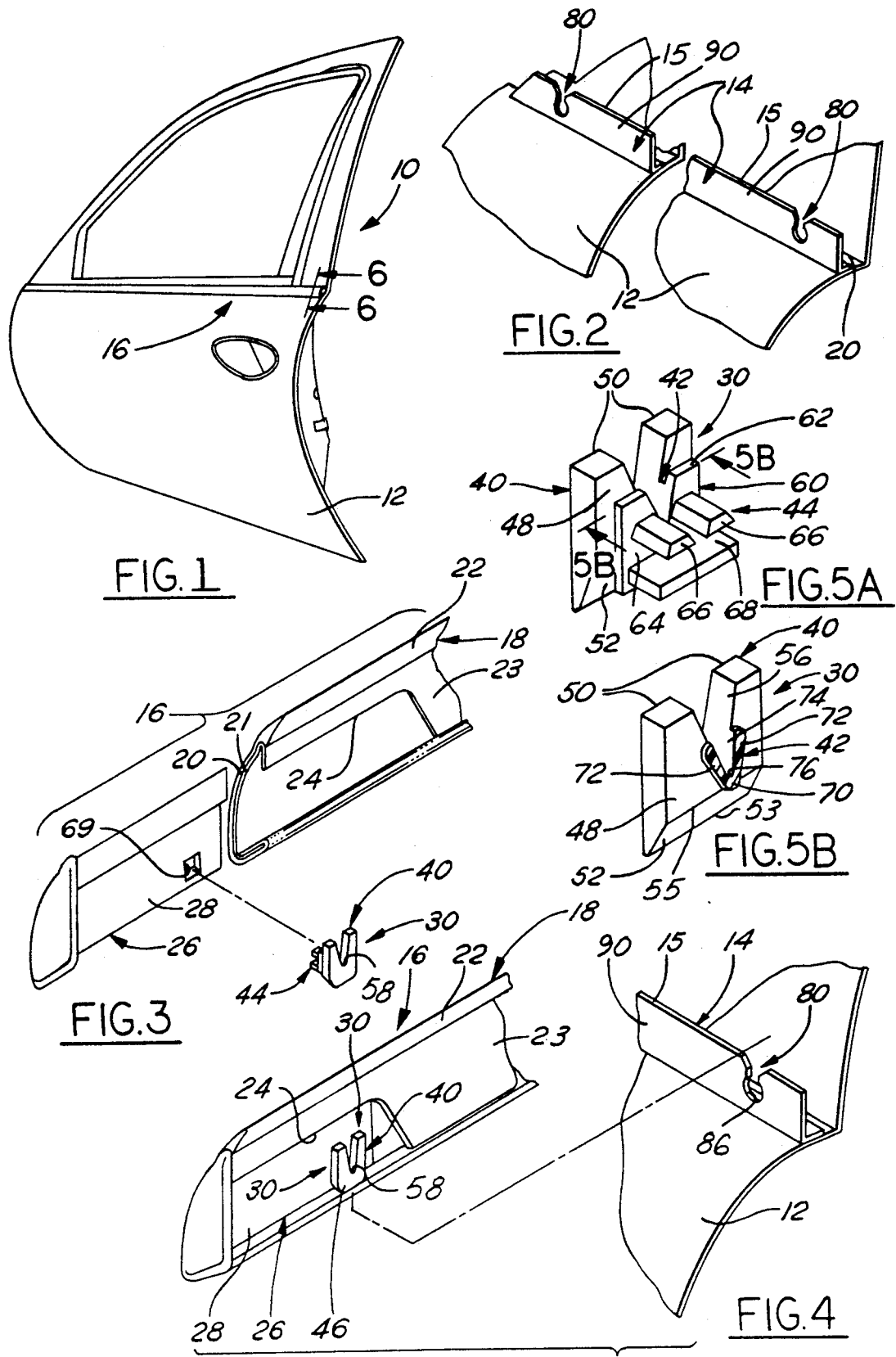

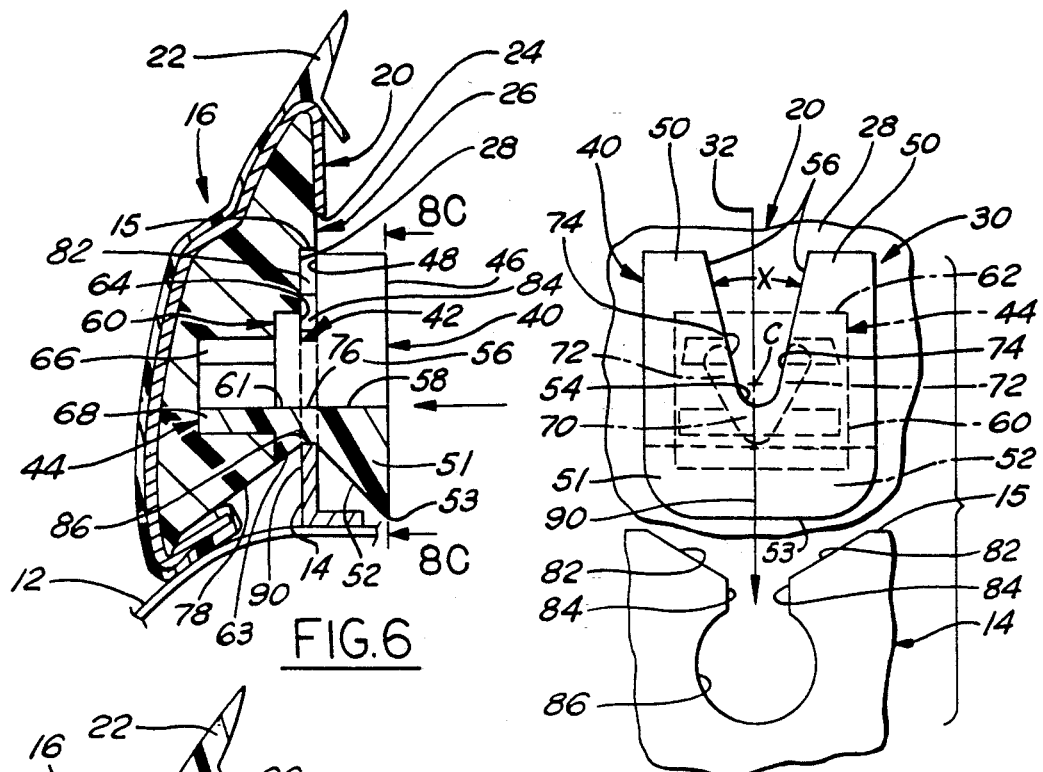

INTEGRAL MOLDING SNAP-IN ATTACHMENT FASTENER

This invention relates generally to attachment arrangements for securing a part to a panel portion of an automotive vehicle body and, more particularly, to such a attachment fastener arrangement for securing a decorative molding to a panel flange.

BACKGROUND OF THE INVENTION

Various arrangements have heretofore been used for securing decorative molding strips and the like to flange portions of a motor vehicle. One such arrangement is found in the U.S. Pat. No. 4,592,937 issued June 3, 1986 to Nagata et al. entitled Arcuate Side Molding. The '937 patent discloses an automobile body arcuate side molding comprising a resin plate having projections formed on the backside thereof, and an intermediate member provided with slots for receiving the projections of the resin plate. In assembling the resin plate and the intermediate member, the projections are inserted through the slots of the intermediate member, and then the tips of the projection sheet heat caulked to join the intermediate member to the resin plate so that the resin plate is slidable relative to the intermediate member.

SUMMARY OF THE INVENTION

A primary object of the present invention is to provide a one-piece plastic T-like fastener member for securing a decorative molding strip to an open keyhole-shaped slot provided in the free edge of a support flange of an automobile body or the like.

It is another object of the present invention to provide one-piece plastic fastener member as set forth above wherein the T-like fastener member has a generally block-shaped bifurcated head joined to the backside of a molding core part by a V-shaped stem. The inboard surface of the fastener head and the molding part backside form layered groove means therebetween slightly larger than the thickness of the support flange. The bifurcated head upper edge has a pair of forked portions separated by a V-shaped compression notch with the forked portions extending upwardly from a lower base portion of the head. The compression notch terminates in a lower radiused root from which extends a pair of upwardly diverging notch walls creating a predetermined acute angle. The V-shaped stem has upwardly diverging arms such that the root juncture profile of their interior walls matches the compression notch root with the inner opposed stem walls disposed at an acute angle equal to the notch angle.

Upon the fastener member layered groove means receiving the flange upper edge on either side of the keyhole-shaped slot, an installer applies a downward force on the molding strip whereby the V-shaped stem portion is passed through the keyhole slotted passage resiliently compressing the stem arms conjointly causing an inward flexing action of the head forked portions transverse to the longitudinal load axis of the passage. The V-shaped stem and lock hole are shaped interlocking profile parts providing a resilient frictional snap-in fit securing the molding strip to the body panel flange so as to accommodate tolerance variations in the molding and lock hole dimensions.

BRIEF DESCRIPTION OF THE DRAWINGS

FIG. 1 is a perspective view of a motor vehicle door structure illustrating a decorative molding strip secured to the outer door panel in accordance with the present invention;

FIG. 2 is a fragmentary perspective view of the fore and aft portions of a door panel belt line upstanding flange with each portion having an open keyhole molding attaching slot in accordance with the present invention;

FIG. 3 is a fragmentary exploded perspective view of a decorative molding strip adapted for attachment to a plastic fastener in accordance with one method of assembly;

FIG. 4 is a fragmentary exploded perspective view of a decorative molding strip and integral fastener arrangement adapted for attachment to an upstanding flange of a vehicle door panel;

FIG. 5A is a detail perspective view of a one-piece fastener arrangement formed from suitable elastomeric material adapted to be integrated with a molding strip;

FIG. 5B is a vertical sectional view taken on the line 5B—5B of FIG. 5A;

FIG. 6 is an enlarged fragmentary vertical sectional view of an installed molding strip taken substantially on the line 6—6 of FIG. 1;

FIG. 7 is a view similar to FIG. 6 showing the molding strip partially installed on the upstanding flange;

FIG. 8A is a fragmentary exploded view of the molding strip fastener arrangement in position for assembly to a subjacent support flange;

FIG. 8B is a fragmentary vertical sectional view, partly in elevation, taken on the line 8B—8B of FIG. 7 showing the fastener arrangement part-way installed in a support flange keyhole slot;

FIG. 8C is a view similar to FIG. 8B showing the fastener arrangement fully installed; and FIG. 9 is a fragmentary horizontal sectional view taken on the line 9—9 of FIG. 8C.

DESCRIPTION OF THE PREFERRED EMBODIMENT

Turning now to the drawings, FIG. 1 depicts a vehicle front door 10 provided with an outer door panel 12 on which an upstanding flange 14 (FIG. 2), having an upper edge 15, supports an ornamental trim or molding strip 16 in a horizontal manner along the door belt line. With reference to FIG. 3, the molding strip 16 comprises an outer tubular-like casing 18 formed of suitable rigid material such as aluminum, for example, having a decorative coating 20 on its outboard wall portion 21. It will be noted that the coating upper portion terminates in a tapered flexible blade 22 adapted for sealing contact with window glass or the like. The casing has an inboard wall portion 23 formed with a cut-out 24 at each end thereof. Terminal ends are provided in the form of core molding parts, only one of which is shown at 26 in FIG. 3. Each core part 26 is preferably formed of injection molded plastic and is contoured for slidable insertion in its assoxiated open end of the molding outer casing 20 as seen in FIG. 4. The core parts 26 are suitably affixed, as by adhesive bonding, in their respective molding strip open ends.

Each core molding part 26 has a planar backside 28 provided with an integral generally T-like fastener 30 adapted to project inboard through its associated cut-out 24. As seen in FIG. 8A, the T-like fastener is symmetrical about its principal longitudinal axis 32 defining a vertical plane of symmetry oriented normal to said molding member backside 28.

As best seen in FIGS. 5A and 5B, the T-like fastener 30, integrally molded of flexible elastomeric material, comprises a bifurcated head portion 40, a stem portion 42, and a mounting anchor portion 44. The bifurcated head portion 40 is generally block-shaped defining opposite inboard 46 (FIG. 6) and outboard 48 parallel faces and a pair of separated forked portions 50 protruding upwardly from a lower base portion 51. FIG. 6 shows the base portion 51 having a right triangle cross section defining a chamfered undersurface 52 sloped upwardly and outwardly from its inboard lower chamfered line edge 53 to contour line 55 formed with outboard face 48 (FIG. 5B). The upper forked portions 50 are separated by a V-shaped compression notch formed therebetween terminating in a lower radiused root portion 54 from which extend a pair of upwardly and outwardly diverging mirror image compression notch walls 56. It will be seen in FIG. 8A that the notch walls 56 define a predetermined acute angle "X" which in the disclosed embodiment is of the order of 30 degrees. As viewed in FIG. 8A, the center of curvature "C" of the compression notch radiused root portion 58 is located substantially equidistant between the forked portions upper edges and lower edge juncture 53.

With reference to FIG. 5A, the T-like fastener anchor mounting portion 44 comprised a mounting plate 60 formed with a V-shaped plate notch having a radiused root 61 (FIG. 6) which conforms in profile with the stem portion radiused interior root 76. It will be seen that upper edge 62 of the mounting plate 60 is spaced downwardly from the upper edges of the forked portions 50 while its lower edge 63 (FIG. 7) chamfered. The inboard surface 64 of the mounting plate 60 integrally supports a pair of inwardly projecting upper tongs 66 and a lower inwardly projecting rectangular-shaped panel-like tongue 68.

The T-like fastener member 30 is preferably attached to the molding core part 26 during a conventional injection molding operation for the core molding member 26. In one such process, the preformed fastener anchor mounting portion 44 is positioned in an injection mold chamber and the liquid material of the core molding member formed around the mounting portion tongs 66 and tongue 68. It will be noted, however, that various other methods may be used to attach the fastener anchor mounting portion 44 to the molding core member. Thus, as seen in FIG. 3, for example, a socket 69 may be formed in the molding member backside 28 and the fastener member mounting anchor portion 44 suitably secured therein as by heat staking or the like.

In FIG. 5B, it will be seen that the stem portion 42 is V-shaped in transverse section and is symmetrically disposed about the vertical plane denoted by the longitudinal axis 32. The V-shaped stem comprises a lower juncture 70 terminating in a downwardly protruding externally convex nose portion 71 while a pair of diverging arm portions 72 extend upwardly from the juncture. As seen in FIG. 8C, each inner wall 74 of the pair of arm portions 72 is co-planar with a corresponding compression notch wall 56 such that the stem walls 74 define a predetermined acute angle equal to the compression notch angle "X". It will also be noted that the notch radiused root 58 and the stem radiused interior root 76 have a common profile.

In FIG. 6, the stem portion 42 is shown having its one inboard end integrally joined to the head portion inner surface 48 and its opposite outboard end integrally joined to the plate 60 of its fastener anchor mounting portion 44. Further, FIG. 6 shows core part 26 having a chamfered undersurface 78, which includes the plate chamfered undersurface 63, in substantial symmetrically opposed relation to the head portion lower chamfered undersurface 52. The chamfered undersurfaces 52, 63, and 78 cooperate to define a downwardly opening triangular-shaped channel providing blind lead-in engagement with the support flange upper edge 15 in fore and aft layered grooves on either side of the stem portion 42. As seen in FIG. 9, the layered grooves are defined intermediate the outboard face 48 of the fastener head portion 40 and the backside 28 of the molding core part 26. It will be seen that the inboard surface 64 of the mounting plate 60 is co-planar with the molding core part backside 28 providing, with block outboard face 48, continuous smooth layered grooves. As seen in FIG. 6 with the molding strip 16 installed on the upstanding flange 14 its outer face 90 is concealed from view.

With reference to FIG. 8A, the upstanding flange free upper edge 15 is shown provided with a symmetrical open keyhole-shaped slot 80 having a pair of upper beveled edges 82 providing an entrance to an intermediate vertical slotted passage, defined by parallel edges 84, leading to a lower circular lock hole 86. It will be noted that the open keyhole-shaped slot is symmetrical about its longitudinal load line axis 87. The transverse distance between passage edges 84 is substantially less than the width of the arms 72 This width is calculated to be such that when the arms 72 are deflected inwardly, as seen in FIG. 8B, they may be forced through the passage 84—84 and then resiliently return to their near normal position where they are urged or biased into locked positive contact with the internal circular edge of the lock hole 86.

Initially, during assembly of the molding strip, fastener 30 is held above the flange 14 such that the V-shaped stem nose portion 71 is aligned on the load line axis 87 of the open keyhole slot. Upon the flange upper edge 15 being received in the fore and aft layered grooves on either side of the stem portion 42, the installer applies a downward force on the molding strip 16. The stem nose portion 71 is initially passed through the entrance bevel edges 82 and into the slotted passage 84. This causes the passage 84 to flex the stem arms 72 inwardly as seen in FIG. 8B. As the fastener is molded as an integral member from suitable elastomeric material, the forked portions 50 are conjointly moved inwardly by flexible action transverse to the longitudinal axis 32, towards each other. This enables the stem portion 42 to be readily passed through the slotted passage 84 for resilient capture in the lock hole 86 in a in a snap-in manner. Further, the positive retention of the molding strip 16 causes the molding upper flexible tapered blade seal 22 to be urged into tight sealing contact with the door glass.

While a preferred embodiment has been shown and described to illustrate the invention, other embodiments will become obvious to those skilled in the art. Accordingly, the scope of his invention is set forth in the following claims.

What is claimed is:

1. A vehicle body and molding strip installation comprising, in combination:

a body panel flange of predetermined thickness having an open keyhole-shaped slot formed in a free upper edge thereof symmetrically disposed about a vertical loading axis, said keyhole-shaped slot defined by a pair of upper edge means providing an entrance to an intermediate vertical passage leading to a lower circular lock hole;

a molding strip adapted for concealing an outer face of said flange, said molding strip having a part formed with a backside adapted for connection to said flange by an integral T-like fastener of resilient elastomeric material, said fastener comprising a block-shaped head having inboard and outboard transverse faces disposed parallel to said part backside, a transversely extending stem portion having one end integrally joined to said head outboard face and its other end interconnected by anchor means to said part backside, said stem portion being V-shaped in transverse section oriented about a vertically disposed fastener plane of symmetry;

said head defining a base portion from which project a pair of upstanding forked portions separated by a V-shaped compression notch having its longitudinal axis in said plane of symmetry, said notch terminating at a lower radiused notch root from which extend a pair of upwardly diverging notch walls defining an first acute angle profile;

said V-shaped stem portion comprises a pair of upwardly diverging arms terminating at a lower juncture defining radiused interior stem root from which extend upwardly a pair of diverging arm interior walls defining a second stem acute angle profile common with said first acute angle notch profile, said head portion outboard face and said opposed molding part backside defining layered groove means of predetermined dimension adapted to snugly receive said flange therein;

said lock hole having a predetermined diameter sized to capture said V-shaped stem portion therein providing a friction fit therewith in its installed state, said lock hole having its center spaced a predetermined dimension from said flange upper edge;

whereby with said flange upper edge being received in said layered groove means an installer applies a downward force on said molding strip such that said stem portion is initially passed through said entrance edge means causing said passage to compress said stem arms towards each other, resulting in inward flexing action of said forked portions transverse to the loading axis of said keyhole-shaped slot, thereby enabling said stem portion to be passed through said passage in a snap-in manner and thereafter substantially returning to a relaxed state for resiliently biased retention in said lock hole so as to positively secure said molding part to said flange.

2. The vehicle body and molding strip installation as set forth in claim 1 wherein said keyhole-shaped slot upper edge means is in the form of a pair of beveled edges.

3. The vehicle body and molding strip installation as set forth in claim 1 wherein said layered groove means is in the form of a pair of layered grooves defined on either side of said V-shaped stem portion.

4. The vehicle body and molding strip installation as set forth in claim 1 wherein said T-like fastener comprises a mounting anchor portion.

5. The vehicle body and molding installation as set forth in claim 4 wherein said anchor mounting portion comprises a mounting plate formed with a V-shaped groove having a root portion conforming in contour with the stem radiused interior root portion and the compression notch radiused root portion.

6. The vehicle body and molding installation as set forth in claim 5 wherein said mounting plate having an inboard surface thereof integrally supports a pair of inwardly projecting upper tongs and a lower inwardly projecting rectangular-shaped tongue disposed in a horizontal plane.

7. The vehicle body molding strip installation as set forth in claim 1 wherein said base portion having a triangular section defining a chamfered undersurface sloped upwardly from a lower line edge at said inboard face defining a contour line therewith.

8. The vehicle body and molding strip installation as set forth in claim 7 wherein the mounting plate defines a chamfered undersurface.

9. The vehicle body and molding strip installation as set forth in claim 1 wherein said molding strip comprise a tubular-like outer casing formed of a rigid material, said casing having an inboard wall portion formed with a cut-out at each end thereof, said part being in the form of an end core part adapted for slidable insertion in a conforming open end of said outer casing.

10. The vehicle body and molding strip installation as set forth in claim 1 wherein said V-shaped stem juncture has a lower nose portion located slightly above an inboard face contour line, said V-shaped stem arms having their upper ends spaced downwardly a predetermined dimension from the upper ends of said head forked portions.

* * * * *